2,840,612

METHOD OF PREPARING 3-ETHOXY-4-HEXENAL

Raymond I. Hoaglin and Donald G. Kubler, South Charleston, W. Va., assignors to Union Carbide Corporation, a corporation of New York No Drawing. Application August 1, 1956
Serial No. 601,354

12 Claims. (Cl. 260—602)

This invention relates to a polyfunctional carbonyl compound and to a process of preparing the same. More particularly, this invention concerns the preparation of an unsaturated beta-alkoxycarbonyl compound by reacting an unsaturated aldehyde with an unsaturated ether in the presence of a Friedel-Crafts catalyst.

According to heretofore customary procedures it was known to prepare saturated beta-alkoxycarbonyl compounds by the addition of an alcohol to the carbon-to-carbon double bond of alpha, beta-unsaturated carbonyl compounds. Another alternative procedure involved the reaction of acetals with unsaturated ethers followed by hydrolysis of the resultant alkoxyacetals.

It is also known to produce various substituted meta-dioxanes and resinous acetals by the reaction of saturated aldehydes and unsaturated ethers, with subsequent hydrolysis of certain of these complex acetals, to form alpha, beta-unsaturated aldehydes.

None of these foregoing procedures, however, disclose the preparation of unsaturated beta-alkoxyaldehydes.

According to the present invention a mixture is formed of at least one mole of crotonaldehyde, no more than one mole of vinyl ethyl ether, and a Friedel-Crafts catalyst, under substantially anhydrous conditions, at a temperature in the range of 10° C. to 120° C. to form 3-ethoxy-4-hexenal. The reaction is performed under essentially anhydrous conditions to prevent hydrolysis of the vinyl ethyl ether. It should be noted that the vinyl ethyl ether can be brought into contact with the catalyst composition only simultaneously with or subsequent to admixture of the catalyst with the crotonaldehyde. Preferably, in a batchwise process, the catalyst is dissolved in the crotonaldehyde with subsequent addition of the vinyl ethyl ether thereto while stirring the reaction mixture. After the reaction is complete the resultant mixture may be desirably neutralized with a suitable base such as, for example, sodium bicarbonate, sodium carbonate, sodium hydroxide, or sodium acetate. The aqueous layer is then removed and the organic layer distilled to separate out and recover the unreacted crotonaldehyde and the 3-ethoxy-4-hexenal. Where a continuous process is employed, the reactants and catalyst are usually introduced into the reaction chamber simultaneously.

The term Friedel-Crafts catalyst as it is employed throughout this specification is intended to encompass sulfoacetic acid, concentrated sulfuric acid and the metallic halides such as, for example, zinc chloride, ferric chloride, mercuric chloride, cupric bromide, boron trifluoride, gallium trichloride, stannic chloride, bismuth trichloride, antimony chloride, and aluminum chloride.

The amount of catalyst to be employed can be varied considerably without adversely affecting the reaction. Optimum concentrations are from approximately 0.02 percent to 2 percent of catalyst by weight of the reactant compounds. A less preferred limit permits use of 0.01 percent to 5 percent of catalyst by weight of the reactant crotonaldehyde and vinyl ethyl ether. Below these limits the rate of reaction is considerably reduced. The upper limit for catalyst concentration is an economic rather than a chemical one.

The operative temperature range for obtaining a satisfactory yield of the product 3-ethoxy-4-hexenal is between 10° C. and 120° C. and preferably no more than 100° C. No advantage is seen in employing temperatures below 10° C. since the rate of the desired reaction is slowed down considerably. The temperature of the reaction mix may be maintained within the desired temperature range by heating or cooling of the reaction vesesl and also by controlling the feed of vinyl ethyl ether thereto.

It should be noted that while there must be present at least one mole of crotonaldehyde to one mole equivalent of vinyl ethyl ether, any mole ratio wherein the aldehyde is present in excess of one is also operative. However, the reaction is preferably carried out with 2.5 to 5 moles of reactant crotonaldehyde to one mole of ether. Residence times are not significant in the practice of the present invention, since the reactions are usually instantaneous.

3-ethoxy-4-hexenal prepared by the process of the present invention can be hydrogenated using Raney nickel catalyst at a temperature of from about 50° C. to 150° C. under a pressure of about 500 p. s. i. g. (pounds per square inch gauge) to 3000 p. s. i. g. to form the corresponding alcohol, 3-ethoxy-1-hexanol. This alcohol can be reacted with phthalic anhydride in the presence of sulfuric acid catalyst using a slight excess of the alcohol as a water entrainer. The temperature may be maintained at 180° C. to 200° C. until all of the water is removed. The resultant ester-alcohol mixture can be neutralized with sodium bicarbonate, washed with water and distilled to recover di-(3-ethoxy-1-hexyl) phthalate which is useful as a plasticizer with solid polyvinyl chloride resins.

3-ethoxy-4-hexenal, in addition, readily undergoes hydrolytic de-ethanolation in the presence of a 50 percent aqueous solution of acetic acid to form sorbaldehyde, which by standard silver oxide oxidation can be converted to sorbic acid, a well-known food preservative.

The following examples are further illustrative of the invention.

Example 1

To 630 grams (9 moles) of crotonaldehyde in a one-liter flask equipped with a stirrer, an addition funnel, a thermometer and a condenser, there was added 33.8 grams of a 25 percent solution of zinc chloride in diethyl ether. The mixture was heated to 92° C. and 216 grams (3 moles) of vinyl ethyl ether was added over a period of 33 minutes while stirring and maintaining the solution at about 90° C. The solution was cooled to room temperature with an ice-bath and 25 grams of sodium carbonate in 200 grams of water was added with stirring. The solution was filtered to remove insoluble solids and the water layer separated. Distillation of the organic layer provided 179 grams (42 percent yield) of 3-ethoxy-4-hexenal which boiled over the range of 54 to 65° C./10 mm. Hg.

Example 2

In a manner similar to that used in Example 1, crotonaldehyde and vinyl ethyl ether were reacted at 40° C. in the presence of 0.05 percent boron trifluoride (as the etherate) based on the total charge weight. The 3-ethoxy-4-hexenal was isolated in 27 percent yield.

Example 3

Crotonaldehyde and vinyl ethyl ether were reacted at 60° C. with 1.4 grams of cupric bromide as a catalyst in the manner described above in Example 1 to provide 3-ethoxy-4-hexenal in 30 percent yield.

Example 4

In a manner similar to Example 1, crotonaldehyde and vinyl ethyl ether were reacted at 60° C. in the presence of 1 gram of ferric chloride. The 3-ethoxy-4-hexenal was isolated in 35 percent yield.

Example 5

The reaction of crotonaldehyde and vinyl ethyl ether was conducted at 60° C. in the presence of 1.7 grams of mercuric chloride in a manner similar to Example 1. The yield of 3-ethoxy-4-hexenal was 4 percent.

Example 6

In a manner similar to that used in Example 1, crotonaldehyde and vinyl ethyl ether were reacted in the presence of 1.9 grams of sulfoacetic acid at 60° C. The yield of 3-ethoxy-4-hexenal was 13 percent.

Example 7

In a manner similar to that used in Example 1, crotonaldehyde and vinyl ethyl ether were reacted in the presence of 0.61 gram of concentrated sulfuric acid at 60° C. The yield of 3-ethoxy-4-hexenal was 12 percent.

We claim:

1. A method of preparing 3-ethoxy-4-hexenal which comprises forming a mixture of vinyl ethyl ether, at least one mole equivalent of crotonaldehyde relevant to said ether, and a Friedel-Crafts catalyst, under substantially anhydrous conditions, at a temperature in the range of 10° C. to 120° C.

2. A method of preparing 3-ethoxy-4-hexenal which comprises forming a mixture of vinyl ethyl ether, at least one mole equivalent of crotonaldehyde relevant to said ether and a Friedel-Crafts catalyst selected from the group consisting of sulfoacetic acid, concentrated sulfuric acid and a metallic-halide, under substantially anhydrous conditions, at a temperature in the range of 10° C. to 120° C.

3. A method of preparing 3-ethoxy-4-hexenal which comprises forming a mixture of 2.5 to 5 moles of crotonaldehyde, 1 mole of vinyl ethyl ether and a Friedel-Crafts catalyst, under substantially anhydrous conditions, at a temperature in the range of 10° C. to 120° C.

4. A method of preparing 3-ethoxy-4-hexenal which comprises forming a mixture of 2.5 to 5 moles of crotonaldehyde and a Friedel-Crafts catalyst selected from the group consisting of sulfoacetic acid, concentrated sulfuric acid and a metallic halide, and adding thereto, under substantially anhydrous conditions, one mole of vinyl ethyl ether, at a temperature in the range of 10° C. to 120° C.

5. A method of preparing 3-ethoxy-4-hexenal which comprises forming a mixture of vinyl ethyl ether, at least one mole equivalent of crontonaldehyde relevant to said ether, and a Friedel-Crafts metallic halide catalyst, under substantially anhydrous conditions, at a temperature in the range of 10° C. to 120° C.

6. A method of preparing 3-ethoxy-4-hexenal which comprises forming a mixture of vinyl ethyl ether, at least one mole equivalent of crotonaldehyde relevant to said ether, and sulfoacetic acid as a catalyst therefor, under substantially anhydrous conditions, at a temperature in the range of 10° C. to 120° C.

7. A method of preparing 3-ethoxy-4-hexenal which comprises forming a mixture of vinyl ethyl ether, at least one mole equivalent of crotonaldehyde relevant to said ether, and concentrated sulfuric acid as a catalyst therefor, under substantially anhydrous conditions, at a temperature in the range of 10° C. to 120° C.

8. A method of preparing 3-ethoxy-4-hexenal which comprises forming a mixture of vinyl ethyl ether, at least one mole equivalent of crotonaldehyde relevant to said ether, and zinc chloride as a catalyst therefor, under substantially anhydrous conditions, at a temperature in the range of 10 °C. to 120° C.

9. A method of preparing 3-ethoxy-4-hexenal which comprises forming a mixture of vinyl ethyl ether, at least one mole equivalent of crontonaldehyde relevant to said ether, and ferric chloride as a catalyst therefor, under substantially anhydrous conditions, at a temperature in the range of 10° C. to 120° C.

10. A method of preparing 3-ethoxy-4-hexenal which comprises forming a mixture of vinyl ethyl ether, at least one mole equivalent of crotonaldehyde relevant to said ether, and mercuric chloride as a catalyst therefor, under substantially anhydrous conditions, at a temperature in the range of 10° C. to 120° C.

11. A method of preparing 3-ethoxy-4-hexenal which comprises forming a mixture of vinyl ethyl ether, at least one mole equivalent of crotonaldehyde relevant to said ether, and cupric bromide as a catalyst therefor, under substantially anhydrous conditions, at a temperature in the range of 10° C. to 120° C.

12. A method of preparing 3-ethoxy-4-hexenal which comprises forming a mixture of vinyl ethyl ether, at least one mole equivalent of crotonaldehyde relevant to said ether, and boron trifluoride as a catalyst therefor, under substantially anhydrous conditions, at a temperature in the range of 10° C. to 120° C.

References Cited in the file of this patent

Hoaglin et al.: J. Am. Chem. Soc. 71, 3468–72 (1949).